United States Patent [19]
Davis et al.

[11] Patent Number: 4,892,118
[45] Date of Patent: Jan. 9, 1990

[54] SILENT VALVE

[75] Inventors: Donald H. Davis, Scotia; Jens Kure-Jensen; Solomon Jenkins, III, both of Schenectady, all of N.Y.

[73] Assignee: General Electric Company, Schenectady, N.Y.

[21] Appl. No.: 714,348

[22] Filed: Mar. 21, 1985

Related U.S. Application Data

[63] Continuation of Ser. No. 395,603, Jul. 6, 1982, abandoned, which is a continuation-in-part of Ser. No. 192,481, Sep. 30, 1980, abandoned.

[51] Int. Cl.⁴ .............................................. F16K 47/02
[52] U.S. Cl. ............................ 137/625.3; 137/625.37; 137/630.13
[58] Field of Search ........... 137/625.3, 625.37, 625.38, 137/625.28, 630.13; 251/118, 120, 127, 210

[56] References Cited

U.S. PATENT DOCUMENTS 3,857,542 12/1974 Heymann ............................ 251/120

FOREIGN PATENT DOCUMENTS

PCT/1708634 5/1971 Fed. Rep. of Germany .
126530 of 0000 Japan .

*Primary Examiner*—Arnold Rosenthal
*Attorney, Agent, or Firm*—Jerome C. Squillaro

[57] ABSTRACT

Slotted, fluid-flow dividing therefor employed in a fluid valve not only to reduce noise but also to shift the frequency spectrum of the noise energy. The slotted therefor is formed integrally with the valve seat. Additionally, the cross-sectional shape of the slots may be varied to more precisely control the lift characteristic of the valve.

14 Claims, 2 Drawing Sheets

SILENT VALVE

This application is a continuation of application Ser. No. 395,603, filed July 6, 1982, now abandoned.

This application is a continuation-in-part of our copending application Ser. No. 192,481, filed Sept. 30, 1980, and commonly assigned.

This invention generally relates to valves for quietly controlling fluid flow. More specifically, the present invention relates to valves which are particularly useful in steam turbine systems.

One important device in which valves are employed is the steam turbine, particularly those employed by electric utilities to generate power. These turbines employ valves specifically referred to as control valves and bypass valves, both of which are characterized by a smooth, continuous change from high-pressure drop when initially slightly opened, low lift, to a low-pressure drop at high lift at fully open position. These valves and others having a similar function are designed to operate not only in an open or closed mode but also in intermediate positions. The term used to describe the degree of openness or closure of a valve is "valve lift". At low lift, the valve is only slightly open; but, at high lifts, the valve is substantially fully open. With respect to control valves, their function in steam turbine-generator systems renders it highly desirable that a low steam pressure drop occurs across the valve at high valve lifts. On the other hand noise in valves is generally predominant at low valve lift conditions.

Most valves generally comprise a body made from a material capable of withstanding the temperatures, pressures, erosiveness and corrosiveness of the intended application. This valve body generally has an inlet port and an outlet port. Also within the valve body there is generally disposed a valve seat against which a valve plug can be made to fit thereby shutting off the flow of pressurized fluid present at the inlet port. This may be accomplished, for example, by applying a force to the exterior shaft portion of the valve plug. As is well known in the steam turbine arts, this force is generally applied through the use of electrohydraulic actuators.

One of the problems that may occur in various valve designs is the production of noise and vibration. Turbine control valves are particularly susceptible to these problems especially at initial levels of valve lift during which pressure drop across the valve is great. Not only is the noise undesirable for a work environment, but additionally, there may be frequency components of the noise and vibration which may be near the resonant frequencies of certain machine elements such as piping structures, particularly at low frequencies. On the other hand, relatively high-frequency noise and vibration is a less significant mechanical problem but may cause high noise levels in the work environment. While some high-pitched noise may be undesirable in a work area, it is also true that the human ear is less and less sensitive to sound as the frequency increases. In fact, aural sensitivity, being essentially gone at approximately 20 KHz, so that mechanisms which cause a sufficient upward shift of the frequency spectrum of the noise offer very desirable advantages. Such mechanisms reduce the apparent noise, particularly as measured on the dbA scale.

A number of patents relating to valve design and more particularly to valve designs having noise-suppressing aspects include the following U.S. Pat. Nos.: 3,451,404; 3,602,261; 3,665,964; 3,704,726; 3,773,085; and 4,066,100. Many of these aforementioned patents employ circular holes in one configuration or another for the purpose of effectuating a bypass fluid flow which avoids the main flow path past the valve plug and valve seat to the outlet port. Nonetheless, these holes are located at least some distance from the valve seat. These geometries lack a full measure of continuous operation. Additionally, a greater level of turbulent flow than is desired may occur in the valve designs of the above-mentioned patents. Also, none of the patents listed above appear to provide a practical valve which is capable of shifting the spectrum of the noise toward the high-frequency range so as to reduce the levels of undesirable vibration in the various components which are connected to the valve at its inlet port, at its outlet port and also at the connection of the valve to the actuating mechanism. Similar ideas have nonetheless been applied to reduction of apparent noise in various designs for jet aircraft engines.

SUMMARY OF THE INVENTION

In accordance with a preferred embodiment of the present invention a valve comprises a pressurizable valve body with an inlet port and an outlet port; a valve seat is disposed within the valve body between the inlet port and the outlet port; a cylindrical plug which is movable against the valve seat controls the flow of fluid through the valve and slotted means affixed to the valve seat divides the flow into a plurality of fluid streams at low valve lift. When in the closed position, the valve plug and valve seat define an area of contact; the slotted means for flow division are disposed immediately adjacent this contact region. In accordance with a preferred embodiment of the present invention, the flow dividing means comprises a slotted cylindrical member affixed to the valve seat and through which the valve plug passes as the valve is closed.

Accordingly, it is an object of the present invention to provide a valve which quietly controls the flow of a fluid, particularly stream, under pressure It is a further object of the present invention to shift the spectrum associated with valve noise to higher than audible frequencies.

It is also an object of the present invention to provide a fully continuously variable throttling of the fluid flow particularly at low levels of valve lift.

It is a still further object of the present invention to provide control of the lift characteristic as is defined hereinafter) of the valve through specific selection of slot geometry.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
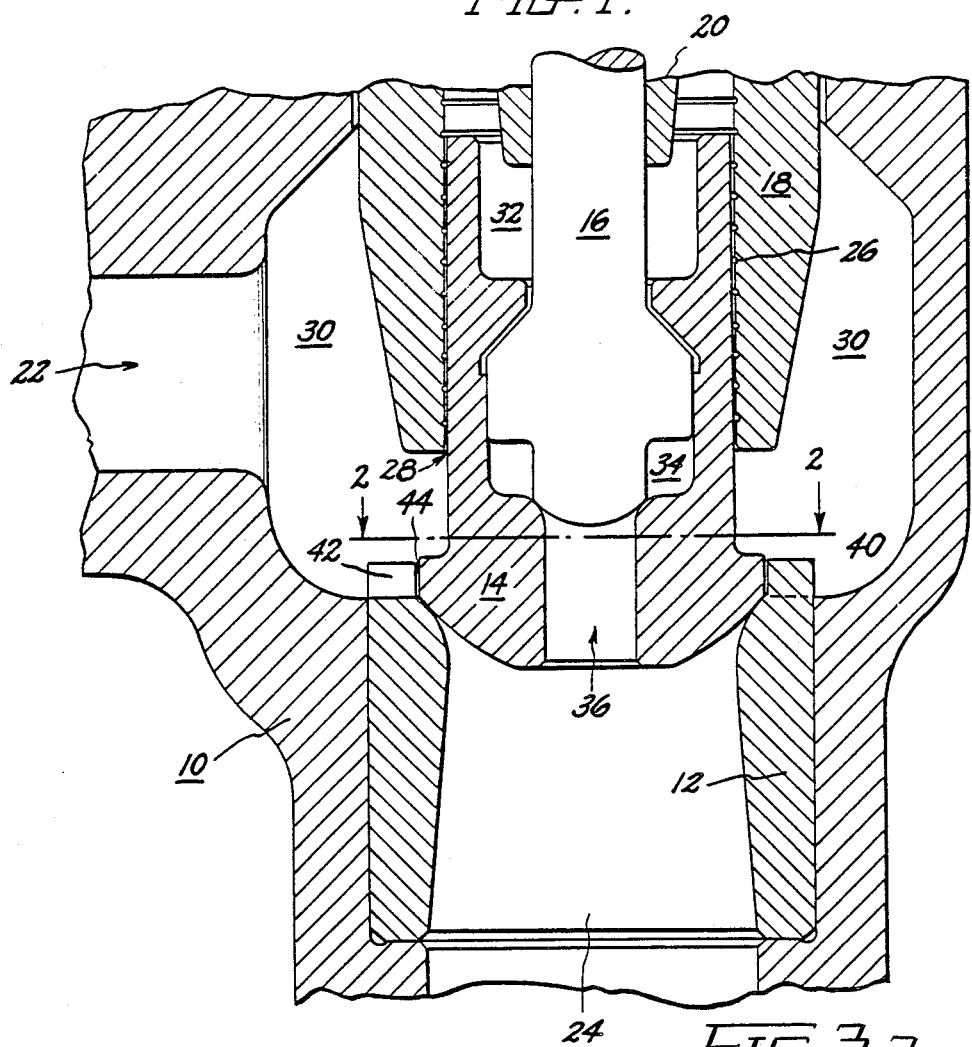
FIG. 1 is a partial vertical cross-sectional side elevation view of a silent valve in accordance with a preferred embodiment of the present invention.

FIG. 1 shows one embodiment of the present invention. In particular, there is shown valve body 10 having inlet port 22 and outlet port 24. Valve seat 12 is disposed within the casing 10. Flow of fluid from the inlet to the outlet is controlled by valve plug 14 which is movable against valve seat 12 so as to interrupt the fluid flow. The valve illustrated is shown in the fully closed position. Valve body 10 also defines chamber 30 which at least partially surrounds valve plug 14, and in the illustrated preferred embodiment completely surrounds plug 14. Valve plug 14 is generally a cylindrical structure, movable, as by an electrohydraulic actuating mechanism, in an axial direction (in the illustrated embodiment vertically). Valve plug 14 is dimensioned so as to properly mate and fit against valve seat 12. Bushing 20 is provided both as a guide for pilot valve plug 16 and also as a sealing member. Likewise, sleeve 18 also acts as a guide and a seal for valve plug 14. The particular valve illustrated here also includes a balance chamber feature and associated stem and pilot valve plug 16, which feature operates to facilitate opening of the valve against the high pressure of fluid which exits in chamber 30.

Although the details of the balance chamber design is not a part of the present invention, nonetheless, its inclusion is desirable in some applications. Accordingly, the operation of the balanced chamber system is now briefly described. Because of the controlled gap 28 between sleeve 18 and the exterior cylindrical wall of valve plug 14, a certain amount of pressurized flow exists, therein between main chamber 30 and the top of balance chamber 32. The pressure in and flow rate through balance chambers is controlled by judicious sizing and by annular grooves 26 in sleeve 18. The size and spacing of these lower balance chamber 34 and, in connection with pilot 16, the pressure. As pilot valve plug 16 is lifted, flow of pressurized fluid occurs so as to exit from pilot valve outlet port 36 and thus into the main outlet port 24. Thus, pressure in chambers 34 and 32 is brought down to nearly the level of pressure in outlet port 24 just prior to "cracking open" valve plug 14 at which time it moves away from the valve seat 12. This pressure renders it significantly easier to open the valve, particularly against the high pressure which may be present in chamber 30.

The feature of the valve shown which renders it particularly effective both in control of noise and flow is indicated by reference numeral 40, indicating flow dividing means with slots 42. As used herein and in the appended claims, the term "slots" or "slotted" refers to an open channel construction. The actual shape of the channel cross sections is not critical and the present invention embraces not only slots with a rectangular shape but also moderate variations therefrom such as the open-based, inverted trapezoidal-like slots with inclined side walls and essentially flat bottoms. While the foregoing phrase is not precise as might be desired, for purposes of this application, it is intended to mean the configuration shown in FIG. 3b and 3c herein.

Figure 4:
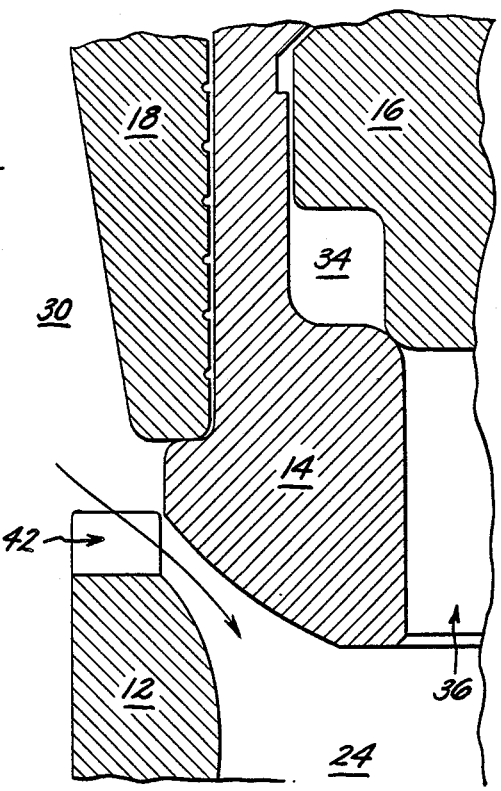
FIG. 4 is a cross-sectional side elevation view of a portion of the embodiment of FIG. 1 with the valve of the present invention plug partly open in a low lift position.

The width-to-length or aspect ratio of these channels or slots will vary according to valve flow, pressure ratio, and lift requirements. The flow dividing means preferably comprises a cylindrical slotted member 40 through which at least a portion of the valve plug 14 passes. As illustrated in FIG. 1, slotted member 40 is affixed to valve seat 12. The clearance 44 between the valve plug and the slotted cylindrical member 40 is carefully controlled and typically only a few thousandths of an inch wide. The clearance 44 is important for the proper operation of the present invention. As soon as valve plug 14 is opened even slightly, flow of pressurized fluid occurs not only through slots 42 but also along the width of the clearance 44. This flow characteristic occurs and is illustrated in FIG. 4 wherein the valve is shown at low lift.

As valve plug 14 is further withdrawn, in a direction along its central cylindrical axis, more and more of the fluid flow occurs through the slots 42. The use of slots rather than holes as described in some of the patents listed above, offers significant advantages in that the flow of depressurized fluid is smoother while being divided through the passage adjacent to the valve seat. The exact number of slots is not critical, but must, for use as a noise control valve in a steam turbine be greater than at least approximately 16. In operation we find that 32 slots is an ideal number. Too few slots will not be effective in raising valve noise to the supra-audible frequency. A preferred number is at least 24 slots and no greater than 60. Except in the largest valves, more than 60 slots would require interslot vanes which cannot bear the stresses to which they are subject. An important feature of the present invention is that fluid flow occurs through all the slots as soon as the valve is cracked open. It is during this portion of the valve plug movement that the highest pressure drop in the flowing fluid occurs. In short, this is generally the most critical level of valve lift for noise generation. Thus, noise generation at high valve lifts and low-pressure drop is relatively little.

Figure 5:
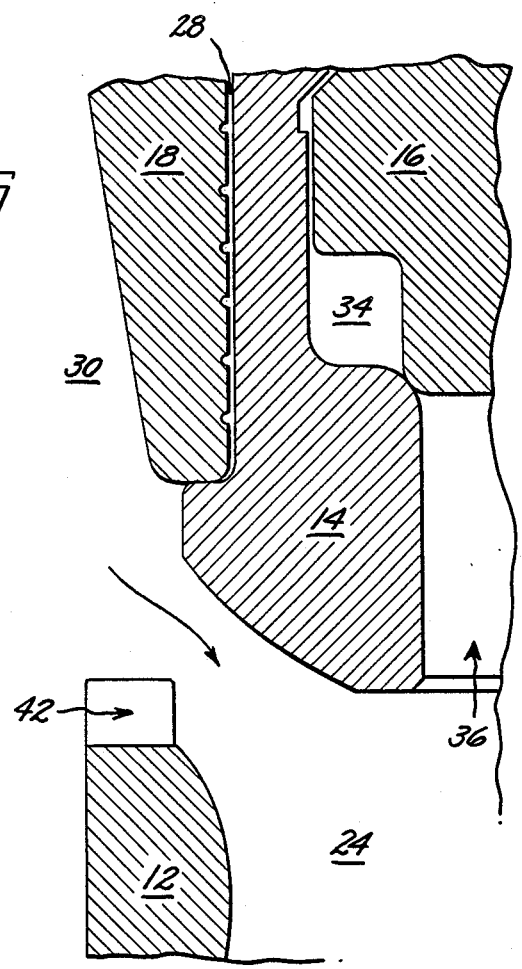
FIG. 5 is a partial cross-sectional side elevation view of the embodiment of FIG. 1 with the valve in the fully open or high valve lift position.

In the present invention the structure and placement of the slotted means assures immediate flow division as soon as any valve lift occurs. This significantly reduces the levels of generated audible noise and vibration thereby facilitating the economic design of structures which are attached to the valve, since over-design to avoid resonance stresses is not necessary. Additionally, the fluid flow is now continuously variable even at very low valve plug lift levels. Also, any noise that may be generated generally has a relatively high frequency component and distribution. Not only is audible noise reduced but for the most part, the noise which may be generated is nonetheless generated in the more tolerable high-frequency portion of the acoustic frequency spectrum 2 Hz to 20 KHz. The slots are open at the top thereof to permit a smooth transition from partially restricted flow to substantially unrestricted flow, illustrated in FIG. 5 which shows a portion of the valve of FIG. 1 in the fully opened position wherein the pressure drop across the valve is minimal.

Figure 2:
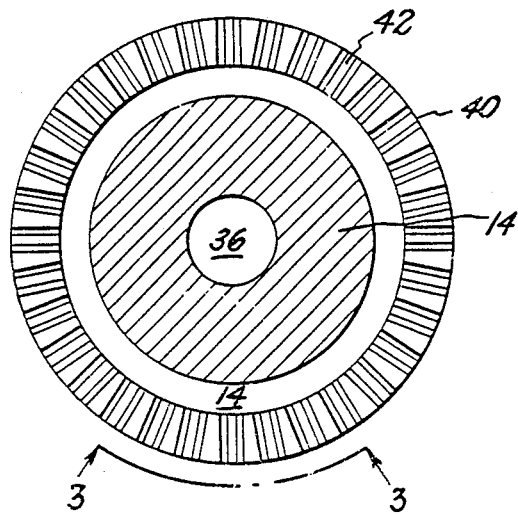
FIG. 2 is a vertical cross section through a portion of the valve shown in FIG. 1 along lines 2—2.

FIG. 2 more particularly illustrates the slotted flow dividing means of the present invention. In particular there is shown cylindrical or annular flow dividing means 40 with slots 42. The annular ring or disc is separated from the valve plug 14 by controlled clearance 44. In the center of the drawing, outlet port 36 is seen. Of course, in those silent valve designs in accordance with the present invention in which a balanced valve design is not employed port 36 would not be present. Additionally, in FIG. 2 it is to be noted that slots 42 are shown as having an open base inverted trapezoidal-like cross section with an essentially flat bottom surface. Accordingly, this fact is indicated in the drawing. For example, in an eight-inch steam turbine bypass valve, approximately 30 of the slots may be employed to effectively control the noise and vibration levels associated with the passage of high-pressure steam between the valve plug and the valve seat. In such a valve, the narrow, bottom portion of the slot cross section may have a dimension of approximately one-quarter inch and the slots may have a height of approximately eight-tenths of an inch, with the top part of the slot having a dimension of approximately one-half inch. Such dimensions provide a slope of approximately 10° to the sidewalls of the slots.

Figure 3A:
FIGS. 3a and 3b are side elevation views of the slots employed in FIG. 1, illustrating different slot geometries.
Figure 3B:
Figure 3C:
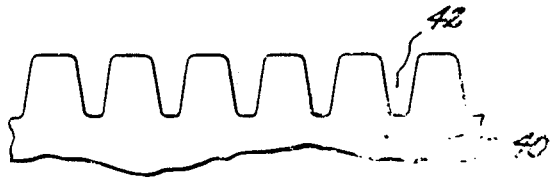

The height of the slots 42 in the vertical direction from top to bottom is determined in relation to the diameter of the circle defined by the contact point between the valve seat and valve plug. Ideally, the ratio of slot height to contact diameter is approximately 0.1, although this ratio may fall within the range of from 0.05 to 0.2. FIG. 3a more particularly describes the ideal embodiment of the slot cross section. Additionally, FIG. 3b illustrates another possible slot cross section which tends to promote a smoother flow through the slots and to reduce stress concentration at sharp angles. In this embodiment sharp angles are replaced by inside and outside fillets. With the slot dimensions set forth above all fillets have a radius of curvative of ⅛ inch. Other slot shapes may be used to obtain specific flow versus lift characteristics, as described below. All slots contemplated by the invention are flat-bottomed to permit a significant amount of steam to flow instantly upon "cracking open" of the valve and to assure that the current of the flow is controlled primarily by the lift of the valve body 14 and not by the shape of the slots.

FIG. 4 illustrates the embodiment of FIG. 1 at a position of "low lift" in which the flow of steam through the valve is flowing principally through the slotted ring and represents the critical condition of lift at which noise would occur if the flow were not broken up into many separate segments by slots 42. After the initial opening, as illustrated in FIG. 4 further withdrawal of plug 14 will permit partial bypassing of slots 42 with the main flow bypassing slots 42 and flowing directly from region 30 to region 24. As illustrated herein, the height of slots 42 with respect to the valve lift is limited, thereby permitting the main flow to bypass slots 42 at high lift.

A significant advantage of the present invention is that the lift characteristics of the valve may be controlled by specific choices for the slot cross-sectional geometry. Specifically herein, it is noted that the term "lift charcteristic" means the flow rate through the valve as a function of the valve lift, that is, the extent to which the valve plug 14 is moved in its axial direction. It is seen that by changing the slot geometry this charcteristic can be altered. This is particularly easily accomplished by varying the shape of the above-described rectangular or open base inverted trapezoidal-like slot cross sections.

From the above it may be appreciated that the valve of the present invention offers advantages not previously found in valves described as being "silent". In particular, the structure of the present valve facilitates a relatively smooth, continuous flow characteristic and not only reduces vibration and noise but also acts to limit the production of noise to frequencies which are generally not deleterious to the valve and piping structures or to the work environment. Additionally, the present valve has an easily modified lift characteristic and the unique parts of the present valve seat may be formed more economically as an integral structure.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A valve for quietly controlling flow of steam comprising:

a pressurizable valve body including an inlet port and an outlet port;

a valve seat disposed within said body between said inlet port and said outlet port;

a cylindrical valve plug movable against said valve seat in an axial direction for continuously controlling the flow of steam between said inlet port and said outlet port, whereby a contact region between said valve seat and said valve plug is defined; and, a cylindrical slotted member affixed to said valve seat and extending a predetermined distance upstream with respect to said valve seat, said slotted member for dividing said flow of steam into a plurality of fluid streams at low valve lift such that the frequency spectrum of noise energy from the flow of steam through said slotted member is shifted toward supra-audible frequency so that audible noise is reduced, said slotted member disposed immediately adjacent said contact region, the predetermined distance of said slotted member limited with respect to valve lift such that at high valve lift substantially all flow of steam from said inlet port to said outlet port bypasses said slotted member, said slotted member open at the predetermined distance from said seat to permit smooth transition from partially restricted flow of steam at low valve lift to substantially unrestricted flow of steam at high valve lift, wherein continuous control of flow of steam from said inlet port to said outlet port is obtained by said valve plug.

2. The valve of claim 1 in which said slotted member and said valve seat comprise an integral structure.

3. The valve of claim 1 wherein said slotted member contains at least approximately 24 slots.

4. The valve of claim 2 in which the slots of said slotted member have inverted open base trapezoidal-like cross sections with essentially flat bottoms.

5. The valve of claim 1 further including pilot valve and balance chamber means for facilitating valve opening against pressure.

6. The valve of claim 2 in which the slots of said slotted member are essentially rectangular apertures.

7. The valve of claim 1 wherein the slots of said cylindrical member are essentially in the form of open-based, inverted trapezoidal-like apertures.

8. The valve of claim 1 wherein the slots of said cylindrical member are essentially rectangular in shape.

9. The valve of claim 2 wherein said slotted member contains from 16 to 60 slots.

10. The valve of claim 2 wherein said slotted member contains approximately 32 slots.

11. The valve of claim 1 wherein the contact region is circular and the axial upstream extent of said slotted member is within the range of 0.05 to 0.2 times the diameter of the contact region.

12. The valve of claim 1 wherein the contact region is circular and the axial upstream extent of said slotted member is approximately 0.1 times the diameter of the contact region.

13. The valve as in claim 1 wherein the contact region is circular and the axial upstream extent of the slots of said slotted member is within the range of 0.05 to 0.2 times the diameter of the contact region.

14. The valve as in claim 1 wherein the contact region is circular and the axial upstream extent of the slots of said slotted member is approximately 0.1 times the diameter of the contact region.

* * * * *